March 6, 1951     D. P. LOWER     2,543,918
SHAFT COUPLING
Filed Oct. 8, 1945     2 Sheets-Sheet 2
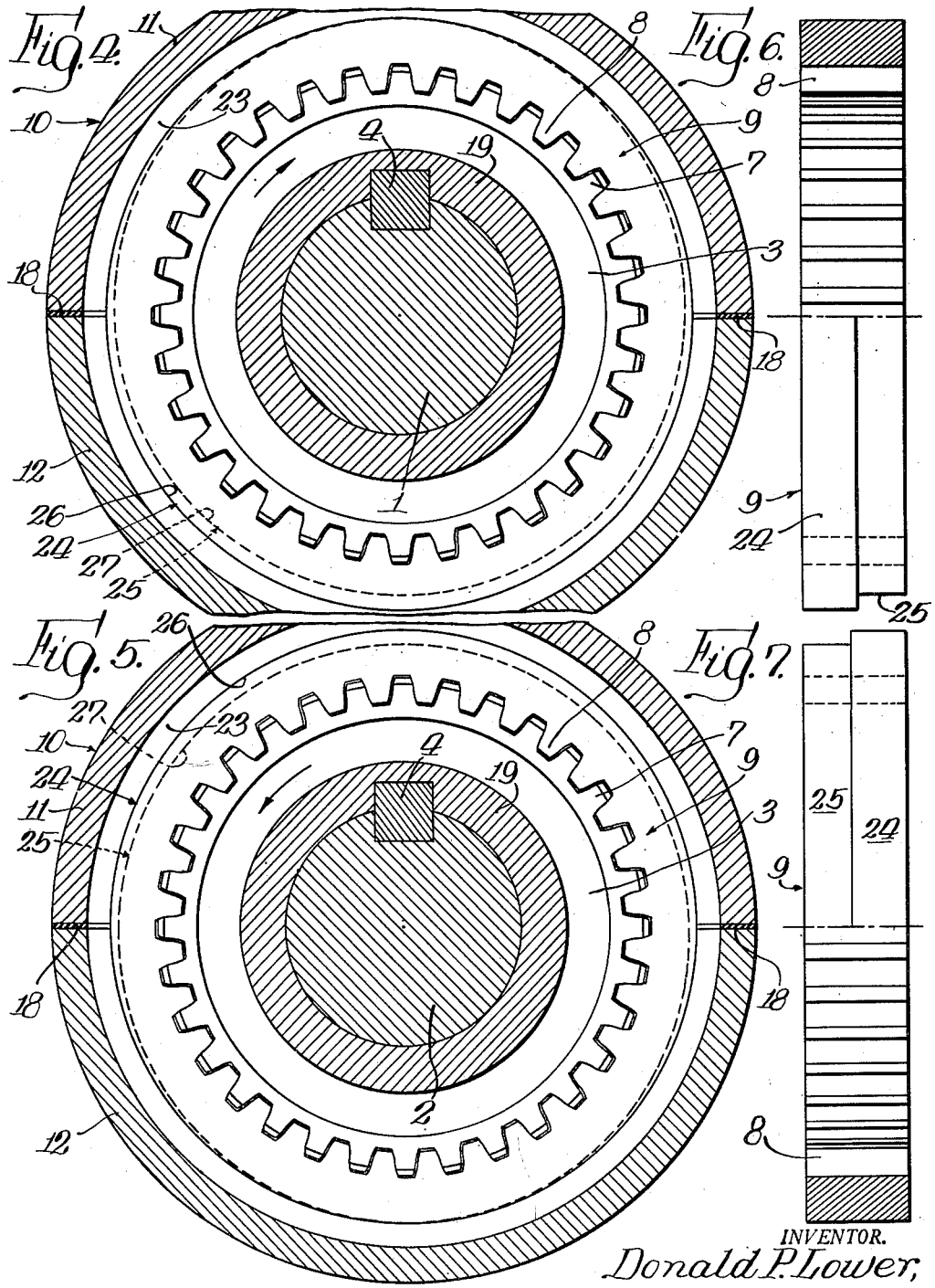
INVENTOR.
Donald P. Lower,
BY Osgood H. Dowell
Atty.

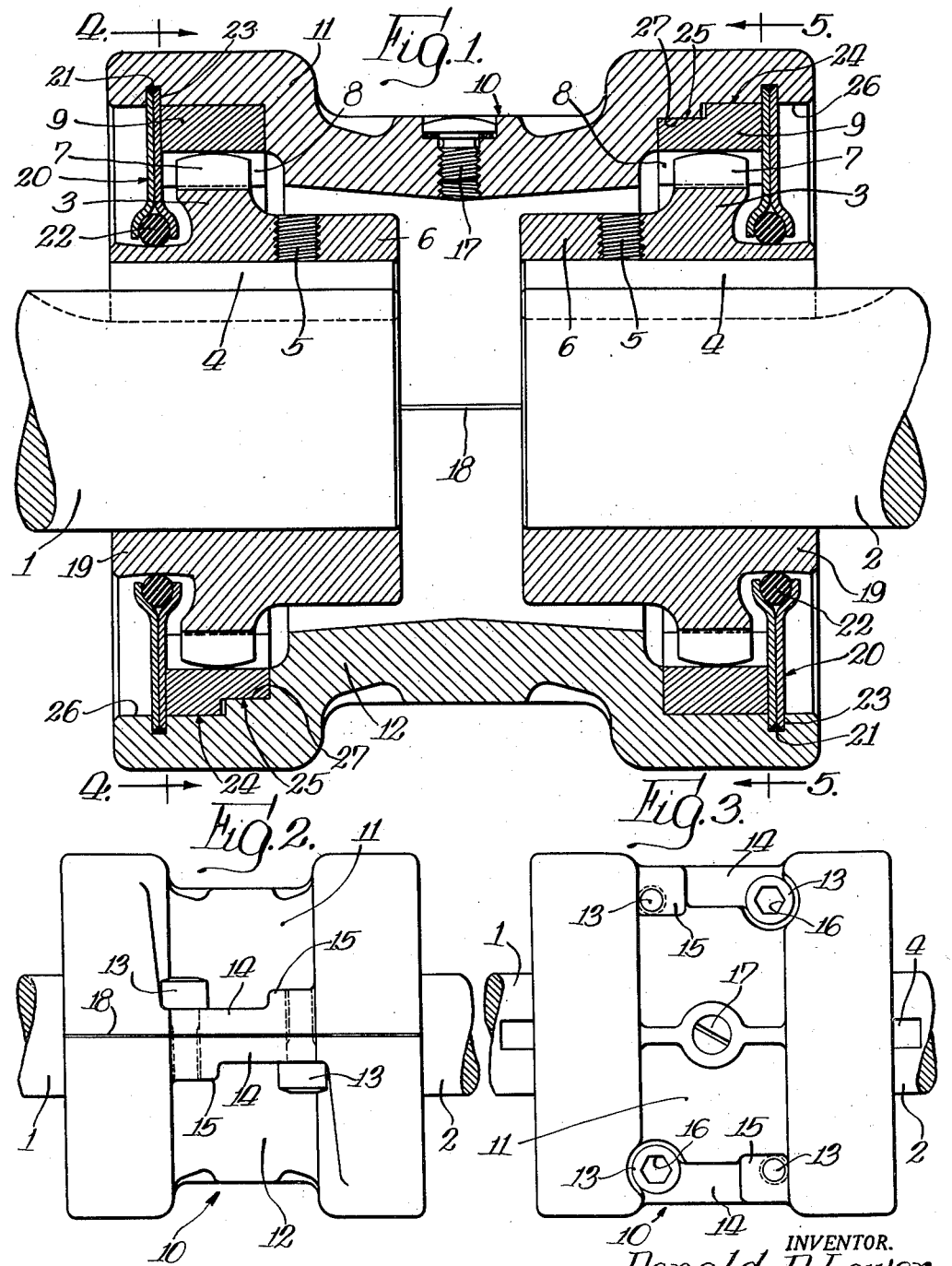

Patented Mar. 6, 1951

2,543,918

UNITED STATES PATENT OFFICE 2,543,918

SHAFT COUPLING

Donald P. Lower, Mishawaka, Ind., assignor to Dodge Manufacturing Corporation, Mishawaka, Ind., a corporation of Indiana Application October 8, 1945, Serial No. 620,969

6 Claims. (Cl. 64—9)

My invention aims to provide an improved shaft coupling of the positive driving connection type, the connection being such as to compensate for misalignment of the shafts.

A coupling embodying the invention is characterized by the utilization of toothed gears fixed on the coupled shafts and interfitted with internally toothed rings removably fixed in a torque-transmitting casing enclosing the gears said casing being split longitudinally and its complemental half parts being separably connected.

The invention embraces a novel general construction having features of practical advantage hereinafter described.

In the accompanying drawings:

Fig. 1 is a longitudinal section of a shaft coupling of one practicable construction embodying the invention.

Fig. 2 is a side elevation thereof on a reduced scale.

Fig. 3 is a top plan view of Fig. 2.

Fig. 4 is a cross section taken on the line 4—4 of Fig. 1, looking in the direction of the arrows.

Fig. 5 is a cross section taken on the line 5—5 of Fig. 1, looking in the direction of the arrows.

Fig. 6 is a view half in side elevation and half in section of the removable ring arranged in the end of the coupling shown in Fig. 4.

Fig. 7 is a similar view of the identical ring arranged in the end of the coupling shown in Fig. 5.

Referring to the drawings, the illustrative coupling is shown installed for connecting driving and driven shafts 1 and 2. The driving shaft may be, for example, the shaft of an electric motor, turbine or engine, and the driven shaft may be that of a machinery unit directly driven from the motor. These shafts are represented in the drawings as accurately aligned, but in practice they may be and often are misaligned.

The shafts are equipped with toothed gears 3. These gears are fixed on the shafts in driving connection therewith, being keyed to the shafts by the keys 4 and secured against longitudinal displacement by set screws 5 threaded in the gear hub extensions 6 and tightened against said keys. The teeth 7 of said gears are interfitted with and slidably engaged by the teeth 8 of internally toothed gear rings 9 which are removably fixed in a torque-transmitting casing 10 and held thereby in spaced relation and concentric with each other. It will be understood that a sufficient clearance is provided between the interfitted teeth 7 and 8 to allow a slight or limited degree of flexing of the coupling to accommodate misalignment of the shafts. Preferably, as shown in Fig. 1, the gear teeth 7 are formed with arcuate tips engaging the rings 9 between the teeth of the latter, so that, in any position assumed by the housing relative to the gears 3, each of such gears will be properly centered in its surrounding ring, with its teeth bearing therein at points of a circle concentric with the gear, and substantially the full power and rotative movement of the driving shaft will be communicated to the driven shaft.

The casing 10 consists of a tubular body having enlarged end portions in which the gear rings 9 are fitted, said body being split longitudinally in the plane of its axis and its complemental half parts 11 and 12 being separably and rigidly connected by suitable bolts or screws. As shown, the half parts of the casing are formed between the enlarged end portions thereof with longitudinal flanges 14, and said half parts are connected by four cap screws 13 arranged as shown, each screw passing loosely through one of said flanges and being screwed into a threaded hole therefor in an enlarged portion 15 of the other flange. Cap screws having circular heads formed with wrench sockets 16 are preferably employed in view of limited space for accommodation of the screw heads. It will be observed that the two parts of the casing are identical, as is desirable in manufacture, and that the casing as a whole is symmetrical about its longitudinal center.

The casing 10, being closed and sealed, may contain oil for lubricating the interengaging gears and gear rings, the oil being introduced through a filling opening normally closed by the removable screw plug 17. Gaskets 18 clamped and compressed between the half parts of the casing seal the joint between them at each side of the coupled shafts. The casing is closed and sealed at its ends, around outer hub extensions 19 of the gears 3, by annular closure plates 20 and associated sealing rings 21 and 22. The gaskets 18 and sealing rings 21 and 22 may be of synthetic rubber or other suitable material. In the specific construction shown, the outer portions of the closure plates 20 are fitted in annular grooves 23 in the casing, whereby said plates are retained in place. The sealing rings 21 are arranged in said grooves and are fitted in annular grooves in the peripheries of said closure plates, said rings being compressed between said peripheries and the housing. The sealing rings 22, stretched over said gear hub extensions 19, are fitted in annular grooves in the central portions of said closure plates, and are compressed between said plates and gear hub extensions. The rings 22 function both as seals and as centering means for the closure plates. Each closure plate 20 may consist of a pair of sheet metal discs shaped as shown and spot-welded together.

The gear rings 9 are so exteriorly shaped and fitted in the casing as to effect locking of said rings against rotative movement relative to the casing. The construction shown for this purpose is quite simple and practicable. As shown, each of said rings is exteriorly formed to provide for a part of its length a cylindrical surface 24 concentric with the pitch circle of the ring teeth 8, and for the remainder of its length a cylindrical surface 25 of less diameter than and eccentric to the surface 24. See Figs. 1 and 4 to 7. By forming the rings so that both cylindrical surfaces 24 and 25 of each ring are tangent to the same plane at one point, the maximum effect of a slight eccentricity of said surfaces is obtained, and no part of the eccentric surface 25 extends radially beyond the surface 24. The rings are arranged as shown, with the parts thereof having the eccentric surfaces 25 extending inwardly from the parts thereof having the surfaces 24. The enlarged end portions of the casing 10 are bored to match the rings, whose surfaces 24 fit in the end bores 26 of the casing and whose surfaces 25 fit in the eccentric casing bores 27 arranged inwardly of the bores 26. With the rings exteriorly formed and arranged as shown, it is entirely practical to bore the casing to match the rings. The end bores 26 of the casing are centered at its axis and concentric with the exterior of the casing. Preferably the walls of the casing bores 26 and 27 are machined to such radii that when the screws 13 are drawn tight, compressing the gaskets 18, the rings 9 have a snug or close fit in the casing, being eccentrically locked against rotative movement relative to the casing and held from endwise displacement by the end closure plates 20.

The coupling can be easily installed and dismantled, and the gear rings 9 when worn can be removed and replaced for increasing the life and efficiency of the coupling. With the coupling installed as shown in Fig. 1, the gap or clearance between the adjacent ends of the shafts and gears thereon is only slightly wider than an individual gear ring. Upon separating and removing the casing, the gear rings 9 can be slipped off from the gears 3 and withdrawn through the gap between the shaft ends. New gear rings may then be introduced between the shaft ends and slipped on the gears and appropriately positioned thereon; whereupon the half-parts of the casing may be fitted around the substituted rings and around the end plates 20, and then fastened together. Thus the coupling may be dismantled and reconstituted with replaced gear rings without disturbing the shafts. Nor does the coupling require for installation an initial separation of the shafts a greater distance apart than necessary to permit passing an individual gear between the shafts.

The gear rings of a coupling embodying the invention are to be considered as concentric in the sense of the following claims if the pitch circles of the teeth of said rings are substantially or approximately concentric, disregarding such minor variations from true concentricity as may be within ordinary manufacturing tolerances or practically immaterial.

I claim:

1. A shaft coupling comprising gears adapted to be fixed on the shafts to be coupled, internally toothed gear rings interfitted with said gears, a torque-transmitting casing comprising longitudinal half parts separably connected with interposed gaskets sealing the joint therebetween, said rings being enclosed by and fixed in the casing in driving connection therewith, the rings being in concentric relation, said casing having internal annular grooves adjacent to the outer end faces of said rings, and end plates engaging said grooves and sealed in the casing and around hub extensions of said gears, said casing and end plates and sealing means therefor providing an oil-holding housing enclosing said rings and gears.

2. A shaft coupling comprising gears adapted to be fixed on the shafts to be coupled, internally toothed gear rings interfitted with said gears, said rings being exteriorly formed each for a part of its length with a cylindrical surface concentric with the pitch circle of its teeth and for the remainder of its length with a cylindrical surface of smaller diameter than and eccentric to but not projecting radially beyond the first mentioned surface, the rings being arranged with their eccentric parts extending inwardly from the parts of the rings which are exteriorly concentric with the pitch circles of the ring teeth, and a casing having its end portions bored to match said rings and in which the rings fit, said casing comprising separably connected longitudinal half parts which when disconnected can be removed outwardly from said rings.

3. An element for a shaft coupling of the type described comprising an internally toothed gear ring exteriorly formed for a part of its length with a cylindrical surface concentric with the pitch circle of its teeth and for the remainder of its length with a cylindrical surface of smaller diameter than and eccentric to but not projecting radially beyond the first mentioned surface.

4. A casing for a shaft coupling of the type described comprising a longitudinally split tubular body having its parts separably connected, said housing having concentric end bores and smaller bores eccentric to and extending inwardly from said end bores, the walls of said smaller bores being wholly within imaginary extensions of the walls of said end bores.

5. A shaft coupling comprising gears adapted to be fixed on the shafts to be coupled, internally toothed gear rings interfitted with said gears, and a longitudinally split torque-transmitting casing having its parts separately connected and fitting around said rings and removable therefrom upon disconnecting said parts, said rings being exteriorly formed each for a part of its length with a cylindrical surface concentric with the pitch circle of its teeth and for the remainder of its length with a cylindrical surface eccentric to that first mentioned, said casing parts having correspondingly formed interior surfaces fitting said cylindrical surfaces of said rings, whereby the rings are held by the casing against rotative movement relative thereto, the rings so held being concentric with the casing.

6. An element for a shaft coupling of the type described comprising an internally toothed gear ring exteriorly formed for a part of its length with a cylindrical surface concentric with the pitch circle of its teeth and for the remainder of its length with a cylindrical surface of smaller diameter than and eccentric to said first mentioned surface, said cylindrical surfaces being tangent to the same plane at one point.

DONALD P. LOWER.

REFERENCES CITED

The following references are of record in the file of this patent:

UNITED STATES PATENTS

| Number | Name | Date |
| --- | --- | --- |
| 1,007,312 | Rotter | Oct. 31, 1911 |
| 1,905,431 | Banner | Apr. 25, 1933 |
| 1,983,007 | Simmons | Dec. 4, 1934 |
| 2,021,718 | Fast | Nov. 19, 1935 |
| 2,146,898 | Johnson et al. | Feb. 14, 1939 |
| 2,310,329 | Tyler | Feb. 9, 1943 |